United States Patent
Kazama

(10) Patent No.: US 10,268,388 B2
(45) Date of Patent: Apr. 23, 2019

(54) ACCESS CONTROL METHOD, STORAGE DEVICE, AND SYSTEM

(71) Applicant: FUJITSU LIMITED, Kawasaki-shi, Kanagawa (JP)

(72) Inventor: Satoshi Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 6 days.

(21) Appl. No.: 15/399,785

(22) Filed: Jan. 6, 2017

(65) Prior Publication Data
US 2017/0206029 A1    Jul. 20, 2017

(30) Foreign Application Priority Data
Jan. 15, 2016   (JP) ................................ 2016-006021

(51) Int. Cl.
*G06F 3/06* (2006.01)
*G06F 13/28* (2006.01)

(52) U.S. Cl.
CPC ............ *G06F 3/061* (2013.01); *G06F 3/0659* (2013.01); *G06F 3/0679* (2013.01); *G06F 13/28* (2013.01)

(58) Field of Classification Search
CPC ...... G06F 3/0601; G06F 3/0602; G06F 3/061; G06F 3/0655; G06F 3/0656;
(Continued)

(56) References Cited

U.S. PATENT DOCUMENTS 5,379,381 A * 1/1995 Lamb ...................... G06F 13/28
710/24
5,592,682 A * 1/1997 Chejlava, Jr. ......... G06F 3/0601
710/3
(Continued)

FOREIGN PATENT DOCUMENTS

JP   10-222456   8/1998
JP   2005-242411   9/2005

OTHER PUBLICATIONS

Edrington, JD, et al. "Dynamic Selection of DMA or PIO for Best Performance". IBM Technical Disclosure Bulletin. vol. 33, No. 2. Jul. 1990. IBM Corporation. pp. 305-306. (Year: 1990).*
(Continued)

*Primary Examiner* — Thomas J Cleary
(74) *Attorney, Agent, or Firm* — Fujitsu Patent Center

(57) ABSTRACT

An access control method includes: determining a number of a plurality of commands to be continuously transferred; transferring to a storage device, a transfer preparation completion command indicating that preparation for transfer of the plurality of commands is completed, when it is determined that the number is greater than or equal to a threshold value; transferring, in sequence, to the storage device, the plurality of commands when it is determined that the number is less than the threshold value; when a command transferred from the host device is the transfer preparation completion command, issuing a direct memory access request to the host device based on the transfer preparation completion command and receiving the plurality of commands transferred from the host device by a direct memory access method based on the direct memory access request; and accessing the storage, based on each of the plurality of commands received.

17 Claims, 11 Drawing Sheets

(58) Field of Classification Search
CPC ............... G06F 3/0659; G06F 3/0679; G06F 2003/0691; G06F 13/28; G06F 13/30; G06F 13/32; G06F 13/34
See application file for complete search history.

(56) References Cited

U.S. PATENT DOCUMENTS

| | | | | |
|---|---|---|---|---|
| 5,805,920 | A * | 9/1998 | Sprenkle | G06F 9/544 710/1 |
| 7,568,055 | B2 * | 7/2009 | Nakai | G06F 21/608 709/212 |
| 2007/0130386 | A1 * | 6/2007 | Henson | G06F 13/28 710/24 |
| 2010/0031000 | A1 * | 2/2010 | Flynn | G06F 17/30949 711/216 |
| 2012/0124121 | A1 * | 5/2012 | Pope | H04L 49/9094 709/201 |

OTHER PUBLICATIONS

Lars Rzymianowicz. "Designing Efficient Network Interfaces for System Area Networks". Aug. 28, 2008. University of Mannheim. (Year: 2008).*

"GT Memory Access: PIO vs. DMA". Technology White Paper. Curtiss Wright Controls Electronic Systems. 2009. (Year: 2009).*

"SCRAMNet GT Network Software and API Guide". Curtiss Wright Controls, Inc. Aug. 19, 2007. Document No. G-T-ML-G1AP1###-A-0-A5 (Year: 2007).*

Gray, Richard Scott. "A Study of Disk Performance Optimization". Electronic Thesis and Dissertations. East Tennessee State University. May 2000. (Year: 2000).*

Rzymianowicz, Lars, et al. "ATOLL: A Network on a Chip". 1999 International Conference on Parallel and Distributed Processing Techniques and Applications (PDPTA'99). 1999. Paper ID: 780SP. (Year: 1999).*

* cited by examiner

FIG. 3A

| DFLG=0 | COMMAND TYPE | ADDRESS IN DATA STORAGE UNIT | SIZE INFORMATION | ⌐ CMD1 (CMDa1) |

FIG. 3B

| DFLG=1 | ADDRESS IN DRAM WITHIN HOST DEVICE | SIZE INFORMATION | ⌐ CMD1 (CMDb1) |

US 10,268,388 B2

ACCESS CONTROL METHOD, STORAGE DEVICE, AND SYSTEM

CROSS-REFERENCE TO RELATED APPLICATION

This application is based upon and claims the benefit of priority of the prior Japanese Patent Application No. 2016-006021, filed on Jan. 15, 2016, the entire contents of which are incorporated herein by reference.

FIELD

The embodiments discussed herein are related to an access control method, a storage device, and a system.

BACKGROUND

The Advanced Technology Attachment (ATA), which is one of the interface standards for coupling a computer and a device such as a hard disk, employs transfer modes based on a direct memory access (DMA) method, a programmed I/O (PIO) method, and the like. The DMA method is a method of transferring data between a device and a memory without involving a central processing unit (CPU). The PIO method is a method in which a CPU controls data transfer. When data is transferred continuously, the load on the CPU in data transfer by the DMA method decreases compared with data transfer by the PIO method.

Note that an interface control device that performs multiple PIO transfers in a row with no access by a CPU is proposed. This type of interface control device includes a retention unit to retain information containing multiple PIO scripts that are descriptions including PIO commands, and a transfer unit to sequentially process the PIO scripts.

In addition, in recent years, non-volatile storages such as solid state drives (SSDs), which are equipped with NAND flash memories, have been in widespread use.

As an example of related technologies, Japanese Laid-open Patent Publication No. 2005-242411 is known.

SUMMARY

According to an aspect of the invention, an apparatus includes an access control method performed by a system, in which the system includes a host device including a processor, a storage, and a storage device, the method includes: first determining a number of a plurality of commands to be continuously transferred; first transferring to the storage device, a transfer preparation completion command indicating that preparation for transfer of the plurality of commands is completed, when the first determining determines that the number is greater than or equal to a threshold value; second transferring, in sequence, to the storage device, the plurality of commands when the first determining determines that the number is less than the threshold value; first receiving a command from the host device; when the received command is the transfer preparation completion command, issuing, based on the transfer preparation completion command, a direct memory access request to the host device, and second receiving the plurality of commands transferred from the host device by a direct memory access method based on the direct memory access request; and accessing the storage, based on each of the plurality of commands received by the first receiving or the second receiving.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B each illustrates an example of a command issued to a non-volatile storage by a CPU;

DESCRIPTION OF EMBODIMENTS

A host device such as a server, equipped in a system together with an SSD, issues to the SSD commands for reading, writing, and the like. The commands issued by the host device are stored in a retention unit within the SSD and are processed in a sequence.

In a system that transfers commands by the DMA method, for example, a host device and a SSD each includes a retention unit, and the plural commands stored in a retention unit within the host device are transferred to a retention unit within the SSD by a DMA method based data transfer. In the DMA method, since multiple commands are transferred continuously without involving a CPU, the amount of time taken to transfer the commands is reduced compared with the PIO method. Note that, when a single command is transferred, as processing to initiate a DMA, such as requesting a DMA request, constitutes an overhead in the DMA method, the amount of time taken to transfer a single command is increased compared with the PIO method.

In one aspect, a non-volatile storage and a processing method of the non-volatile storage, disclosed in the present application, reduce the amount of time taken to transfer commands, regardless of the number of commands transferred from a host device to a non-volatile storage.

Hereinafter, embodiments will be described with reference to the drawings.

Figure 1:
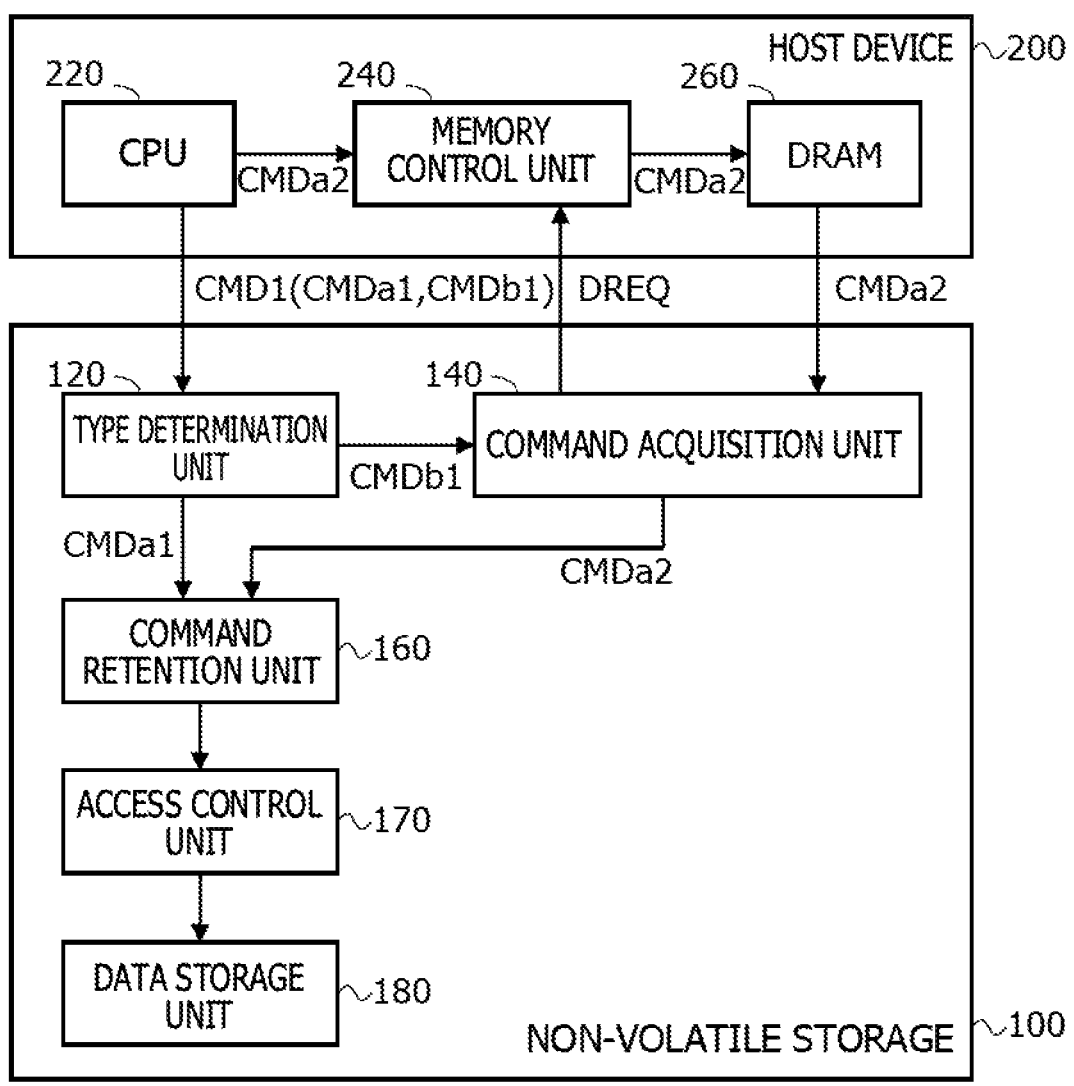
FIG. 1 illustrates an embodiment of a non-volatile storage and a processing method of the non-volatile storage.

FIG. 1 illustrates an embodiment of a non-volatile storage and a processing method of the non-volatile storage. A non-volatile storage 100 illustrated in FIG. 1 is a non-volatile storage device such as the SSD. The non-volatile storage 100 is coupled to a host device 200. First, the host device 200 will be described.

The host device 200 is an information processing device such as a server, which, for example, includes a CPU 220, a memory control unit 240, and a dynamic random access memory (DRAM) 260. The host device 200 issues a command CMD for accessing the non-volatile storage 100. Commands CMDa (CMDa1 and CMDa2) illustrated in FIG. 1 are access commands for controlling access to a data storage unit 180. Note that the access command CMDa1 out of the access commands CMDa is a command that is transferred from the CPU 220 to the non-volatile storage 100 without involving the DRAM 260. The access command CMDa2 out of the access commands CMDa is a command that is transferred from the CPU 220 to the non-volatile storage 100 through the DRAM 260. In addition, a command CMDb1 is a transfer preparation completion command for informing that the host device 202 has completed the preparation for transferring the multiple access commands CMDa2. In the example illustrated in FIG. 1, a command CMD1 that a type determination unit 120 receives from the host device 200 is an access command CMDa1, a transfer preparation completion command CMDb1 or the like that is transferred from the CPU 220 to the non-volatile storage 100 without involving the DRAM 260.

The CPU 220, for example, outputs as a command CMD1, to the non-volatile storage 100, the access command CMDa1 that includes an address, etc. indicating a target of an access to the data storage unit 180 within the non-volatile storage 100. Hereinafter, an address indicating a target of an access to the data storage unit 180 within the non-volatile storage 100 is also referred to as an address in the data storage unit 180 of an access destination.

In addition, when, for example, the CPU 220 transfers multiple commands CMD2 to the non-volatile storage 100 by the DMA method, the CPU 220 stores the multiple access commands CMDa2 including an address and the like of the data storage unit 180 of an access destination, to the DRAM 260 via the memory control unit 240. Then, the CPU 220 outputs the transfer preparation completion command CMDb1 to the non-volatile storage 100 as a command CMD1. The transfer preparation completion command CMDb1 includes addresses indicating storage destinations in the DRAM 260 of the commands CMDa2, information indicating that the commands CMDa2 are transferred by the DMA method, and the like.

The memory control unit 240 controls an operation of the DRAM 260. As described above, at least a portion of the DRAM 260 is allocated to a queue to store therein the access command CMDa2 for accessing the data storage unit 180 within the non-volatile storage 100. Note that a configuration of the host device 200 is not limited to the example illustrated in FIG. 1. Next, the non-volatile storage 100 will be described.

The non-volatile storage 100 includes the type determination unit 120, a command acquisition unit 140, a command retention unit 160, an access control unit 170, and the non-volatile data storage unit 180 to store data.

The type determination unit 120 determines if the command CMD1 received from the host device 200 is the access command CMDa1 or the transfer preparation completion command CMDb1. When the command CMD1 transferred from the CPU 220 includes, for example, the information indicating that the commands CMDa2 are being transferred by the DMA method, the type determination unit 120 determines that the command CMD1 is the transfer preparation completion command CMDb1. Then, when the command CMD1 is the transfer preparation completion command CMDb1, the type determination unit 120 transfers the transfer preparation completion command CMDb1 to the command acquisition unit 140.

In addition, when the command CMD1 includes, for example, no information indicating that the commands CMDa2 are being transferred by the DMA method, the type determination unit 120 determines that the command CMD1 is the access command CMDa1. Then, when the command CMD1 is the access command CMDa1, namely, when the command CMD1 is not the transfer preparation completion command CMDb1, the type determination unit 120 transfers the command CMD1 to the command retention unit 160. The access command CMDa1 is thereby stored in the command retention unit 160. Hereinafter, a method of transferring the access commands CMDa from the CPU 220 to the command retention unit 160 within the non-volatile storage 100 without involving the DRAM 260 is also referred to as a PIO method.

When the type determination unit 120 determines that the transfer preparation completion command CMDb1 is received from the host device 200, the command acquisition unit 140 receives the transfer preparation completion command CMDb1 transferred from the type determination unit 120. Then, based on the transfer preparation completion command CMDb1, the command acquisition unit 140 issues a direct memory access request DREQ to the memory control unit 240 in the host device 200. Hereinafter, the direct memory access request will be also referred to as a DMA request.

The memory control unit 240 that receives the DMA request DREQ transfers the access command CMDa2 requested by the DMA request DREQ, out of the access commands CMDa2 stored in the DRAM 260, to the command acquisition unit 140. The command acquisition unit 140 thereby acquires the access command CMDa2 specified by the transfer preparation completion command CMDb1, from the host device 200. Then, the command acquisition unit 140 transfers the access command CMDa2 acquired from the host device 200 to the command retention unit 160. The access command CMDa2 is thereby stored in the command retention unit 160.

In this way, when the type determination unit 120 determines that the transfer preparation completion command CMDb1 is received from the host device 200, the command acquisition unit 140 issues the DMA request DREQ to the host device 200, based on the transfer preparation completion command CMDb1. Then, using direct memory access transfer based on the DMA request DREQ, the command acquisition unit 140 acquires the multiple access commands CMDa2 from the host device 200. The direct memory access transfer is data transfer based on the DMA method. Hereinafter, the direct memory access transfer will be also referred to as DMA transfer.

The command retention unit 160 is a buffer such as, for example, a ring buffer or a first-in first-out (FIFO). The command retention unit 160 functions as a queue to store therein the access commands CMDa issued by the host device 200. The command retention unit 160 retains the access command CMDa1 transferred from the type determination unit 120, the access command CMDa2 transferred from the command acquisition unit 140, and the like, for example. Namely, the command retention unit 160 retains the access command CMDa1 received by the type determination unit 120 or the access command CMDa2 acquired by the command acquisition unit 140.

Based on the access commands CMDa retained in the command retention unit 160, the access control unit 170 accesses the data storage unit 180. For example, the access control unit 170 executes an access for reading data from the data storage unit 180, an access for writing data to the data storage unit 180, an access for erasing data retained in the data storage unit 180, and the like, based on the access commands CMDa.

The data storage unit 180 is a non-volatile memory such as a NAND flash memory. The data storage unit 180 stores therein data that is handled by the host device 200 and the like. The data storage unit 180 is controlled based on the access commands CMDa stored in the command retention unit 160. Namely, the data storage unit 180 is accessed based on the access commands CMDa received from the host device 200.

In this way, the non-volatile storage 100 is compatible both with command transfer based on the DMA method and command transfer based on the PIO method.

Here, in a system equipped with a non-volatile storage compatible only with the command transfer based on the DMA method, the DMA transfer is performed even when a host device transfers a single command to the non-volatile storage. In this case, processing for initiating the DMA, such as a DMA request, constitutes an overhead, and time taken to transfer the command is increased compared with a case in which the PIO method is used.

In addition, in a system equipped with a non-volatile storage compatible only with the command transfer based on the PIO method, time taken to transfer the commands is increased in a case in which a host device transfers multiple commands continuously to the non-volatile storage, compared with a case in which the DMA method is used.

Note that, in a non-volatile storage in which the DMA method and the PIO method are switched by first executing a mode setting to switch between the DMA method and the PIO method, processing for the mode setting constitutes an overhead and may cause an increase in time taken for the command transfer.

In contrast, in a system equipped with the non-volatile storage 100 and the host device 200, illustrated in FIG. 1, either one of the DMA method or the PIO method is selected for executing a command transfer without first performing the mode setting to switch between the DMA method and the PIO method.

When the host device 200 transfers, for example, a single command CMDa to the non-volatile storage 100, the command transfer based on the PIO method is used reducing the time taken to transfer the command CMDa, compared with a case in which the command transfer based on the DMA method is used. Furthermore, when the host device 200 transfers the multiple commands CMDa continuously to the non-volatile storage 100, the command transfer based on the DMA method is used, reducing the time taken to transfer the commands CMDa, compared with a case in which the command transfer based on the PIO method is used. In this way, since a method in which the time taken to transfer the commands CMDa is shorter, out of the DMA method and the PIO method, is selected by the host device 200, the time taken to transfer commands CMDa is reduced compared with a case in which only one of the DMA method or the PIO method is used.

In addition, the non-volatile storage 100 determines if the command CMD1 transferred from the CPU 220 is the access command CMDa1 or the transfer preparation completion command CMDb1, such that which of the command transfer based on the DMA method or the command transfer based on the PIO method is being executed may be determined. This thereby suppresses the occurrence of an overhead such as the mode setting by which the DMA method and the PIO method are switched prior to a transfer.

In this way, the non-volatile storage 100 is capable of reducing the time for transferring the commands CMDa, regardless of the number of commands CMDa to be transferred from the host device 200 to the data storage unit 180 within the non-volatile storage 100.

Figure 2:
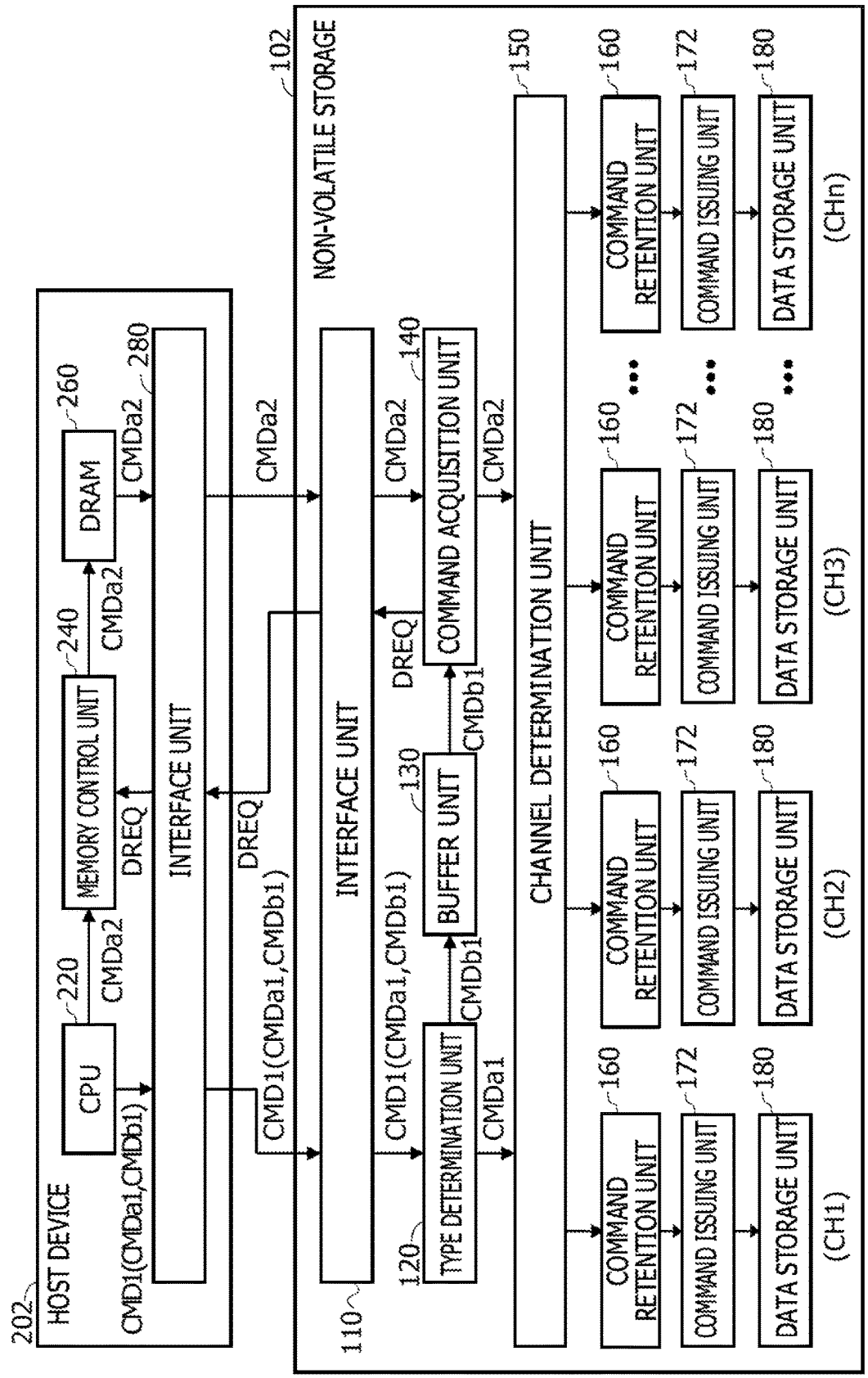
FIG. 2 illustrates another embodiment of a non-volatile storage and a processing method of the non-volatile storage.

Note that a configuration of the non-volatile storage 100 is not limited to the example illustrated in FIG. 1. The non-volatile storage 100 may, for example, include plural channels CH as illustrated in FIG. 2. In this case, the command retention unit 160, the access control unit 170, and the data storage unit 180 are provided for each of the channels CH.

As above, in the embodiment illustrated in FIG. 1, the non-volatile storage 100 determines if the command CMD1 transferred from the CPU 220 within the host device 200 is the access command CMDa1 or the transfer preparation completion command CMDb1. Then, when the command CMD1 transferred from the CPU 220 is the access command CMDa1, the non-volatile storage 100 stores the command CMDa1 transferred from the CPU 220 in the command retention unit 160. In addition, when the command CMD1 transferred from the CPU 220 is the transfer preparation completion command CMDb1, the non-volatile storage 100 acquires the access command CMDa2 stored in the DRAM 260 within the host device 200, by the DMA transfer. Then, the non-volatile storage 100 stores the access command CMDa2 acquired from the DRAM 260 by the DMA transfer, in the command retention unit 160. Since the non-volatile storage 100 is compatible both with the command transfers based on the DMA method and the PIO method, the time taken to transfer the commands CMDa is reduced, regardless of the number of commands CMDa to be transferred from the host device 200 to the non-volatile storage 100.

FIG. 2 illustrates another embodiment of a non-volatile storage and a processing method of the non-volatile storage. The same or similar symbols are assigned to the same elements as or elements similar to the elements described in FIG. 1, and the detailed descriptions thereof will be omitted. A non-volatile storage 102 illustrated in FIG. 2 is a non-volatile storage device such as the SSD. The non-volatile storage 102 is coupled to a host device 202. First, the host device 202 will be described.

The host device 202 is the same as or similar to the host device 200 illustrated in FIG. 1 except that an interface unit 280 is added to the host device 200 illustrated in FIG. 1. The host device 202 is, for example, an information processing device such as a server, which includes the CPU 220, the memory control unit 240, the DRAM 260, and the interface unit 280. The host device 202 issues commands CMD for accessing the non-volatile storage 102.

The interface unit 280 is, for example, an interface compliant with the Peripheral Component Interconnect (PCI) Express standard (hereinafter, also referred to as the PCIe). The interface unit 280 is, for example, coupled to an interface unit 110 compliant with the PCIe within the non-volatile storage 102. The CPU 220, the memory control unit 240, the DRAM 260, and the like, thereby perform data transfer to and from the type determination unit 120, the command acquisition unit 140, and the like within the non-volatile storage 102, via the interface units 280 and 110, for example. Note that a configuration of the host device 202 is not limited to the example illustrated in FIG. 2. Next, the non-volatile storage 102 will be described.

In the non-volatile storage 102 illustrated in FIG. 2, command issuing units 172 are provided in place of the access control unit 170 illustrated in FIG. 1, and the interface unit 110, a buffer unit 130, and a channel determination unit 150 are added to the non-volatile storage 100 illustrated in FIG. 1. In addition, in the non-volatile storage 102, the command retention unit 160, the command issuing unit 172, and the data storage unit 180 are provided for each of the multiple channels CH (CH1, CH2, CH3, . . . , and CHn). The other configuration of the non-volatile storage 102 is the same as or similar to that of the non-volatile storage 100 illustrated in FIG. 1.

The non-volatile storage 102 includes the interface unit 110, the type determination unit 120, the buffer unit 130, the command acquisition unit 140, the channel determination unit 150, the plural command retention units 160, the plural command issuing units 172, and the plural data storage units 180, for example. As described above, the interface unit 110 is an interface compliant with the PCI Express standard.

The type determination unit 120 is the same as or similar to the type determination unit 120 illustrated in FIG. 1. For example, when the command CMD1 transferred from the CPU 220 is determined to be the transfer preparation completion command CMDb1, the type determination unit 120 transfers the command CMD1, namely, the transfer preparation completion command CMDb1 transferred from the CPU 220 to the buffer unit 130. Namely, when the command CMD1 received from the host device 202 is the transfer preparation completion command CMDb1, the type determination unit 120 stores the transfer preparation completion command CMDb1 received from the host device 202 in the buffer unit 130.

In addition, when the command CMD1 is the access command CMDa1, namely, when the command CMD1 is not the transfer preparation completion command CMDb1, the type determination unit 120 transfers the command CMD1 to the channel determination unit 150. The access command CMDa1 is thereby transferred to the channel determination unit 150.

The buffer unit 130 is a buffer such as, for example, a FIFO. The buffer unit 130 retains the transfer preparation completion command CMDb1 transferred from the type determination unit 120. Then, the buffer unit 130 transfers the held transfer preparation completion command CMDb1 to the command acquisition unit 140. Note that while the command acquisition unit 140 is performing processing for acquiring the access command CMDa2 from the DRAM 260 by the DMA transfer, the buffer unit 130 is placed in a wait state regarding transferring the transfer preparation completion command CMDb1 to the command acquisition unit 140, for example. Namely, when the command acquisition unit 140 is not performing processing for acquiring the access command CMDa2 from the DRAM 260 by the DMA transfer, the buffer unit 130 transfers the transfer preparation completion command CMDb1 to the command acquisition unit 140.

The command acquisition unit 140 is the same as or similar to the command acquisition unit 140 illustrated in FIG. 1. The command acquisition unit 140 acquires the transfer preparation completion command CMDb1 from the buffer unit 130, for example. Then, the command acquisition unit 140 issues the DMA request DREQ to the memory control unit 240 within the host device 202, based on the transfer preparation completion command CMDb1. Out of the access commands CMDa2 stored in the DRAM 260, the access commands CMDa2 that are requested by the DMA request DREQ are thereby DMA-transferred to the command acquisition unit 140. The command acquisition unit 140 transfers in sequence the multiple access commands CMDa2 that have been DMA-transferred from the DRAM 260, to the channel determination unit 150.

The channel determination unit 150 receives the access command CMDa1 received by the type determination unit 120 or the access command CMDa2 acquired by the command acquisition unit 140. Namely, the channel determination unit 150 receives the access command CMDa from the type determination unit 120 or the command acquisition unit 140.

The channel determination unit 150 identifies the channels CH that corresponds to the data storage unit 180 of an access target, based on the access commands CMDa transferred from the type determination unit 120 or the command acquisition unit 140. Then, the channel determination unit 150 stores the access commands CMDa transferred from the type determination unit 120 or the command acquisition unit 140 in the command retention unit 160 of the specified channel CH.

In this way, the channel determination unit 150 selects one out of the multiple channels CH based on the access commands CMDa received from the type determination unit 120 or the command acquisition unit 140. Then, the channel determination unit 150 stores the access commands CMDa in the command retention unit 160 of the channel CH selected based on the access commands CMDa.

The command retention units 160 is the same as or similar to the command retention unit 160 illustrated in FIG. 1. The command retention units 160 function as a queue to store therein the access commands CMDa issued by the host device 202, for example.

The command issuing units 172 is an example of an access control unit to access the data storage units 180 based on the access commands CMDa retained in the command retention units 160. The command issuing units 172 read the access commands CMDa retained in the command retention units 160 and issue the read access commands CMDa to the data storage units 180, for example. The accesses to the data storage units 180 are thereby executed based on the access commands CMDa. For example, accesses for reading data from the data storage units 180, accesses for writing data to the data storage units 180, access for erasing data retained in the data storage units 180, and the like, are executed based on the access commands CMDa.

The data storage units 180 is the same as or similar to the data storage unit 180 illustrated in FIG. 1. For example, each of the data storage units 180 is a non-volatile memory such as a NAND flash memory. The data storage units 180 store therein data that is handled by the host device 202 and the like.

Note that a configuration of the non-volatile storage 102 is not limited to the example illustrated in FIG. 2. The buffer unit 130 may be provided within, for example, the command acquisition unit 140. In addition, the type determination unit 120 may include a buffer such as a FIFO, which retains the access command CMDa1, and may transfer the access command CMDa1 to the channel determination unit 150 via the buffer. In this case, while the command acquisition unit 140 is performing processing for acquiring the access commands CMDa2 from the DRAM 260 by the DMA transfer, the type determination unit 120 is placed in a wait state regarding transferring the access command CMDa1 to the channel determination unit 150, for example.

FIGS. 3A and 3B each illustrates an example of the command CMD1 issued by the CPU 220 to the non-volatile storage 102.

When the access command CMDa is transferred by the PIO method, the access command CMDa1 is issued as the command CMD1 by the CPU 220 to the non-volatile storage 102 (FIG. 3A). In this case, the command CMD1 is the access command CMDa1 that includes a flag DFLG having a logical value of "0", a command type, an address in the data storage units 180 indicating an access target area, and size information indicating the size of an access target area. The flag DFLG is allocated, for example, to the first bit of the command CMD1, and when the command CMD1 is the access command CMDa, the flag DFLG is set to the logical value of "0". The command type is identification information for identifying, for example, a read command for reading data, a program command for writing data, an erase command for erasing data, or the like.

When transferring the access commands CMDa by the DMA method, the transfer preparation completion command CMDb1 is issued by the CPU 220 to the non-volatile storage 102 as the command CMD1 (FIG. 3B). In this case, the command CMD1 is the transfer preparation completion command CMDb1 including the flag DFLG having a logical value of "1", an address indicating storage destination of the access command CMDa2 in the DRAM 260, and size information indicating size of the access command CMDa2 for the transfer targets. When the command CMD1 is the transfer preparation completion command CMDb1, the flag DFLG is set to the logical value of "1", for example. Accordingly, the type determination unit 120 determines if the DMA method or the PIO method is selected based on the value of the flag DFLG.

The flag DFLG is compatible with doorbells in the Non-Volatile Memory (NVM) Express standard serving as one of the communication standard for coupling an SSD to a computer, for example. Note that a data structure of the command CMD1 is not limited to the examples illustrated in FIGS. 3A and 3B.

Figure 4:
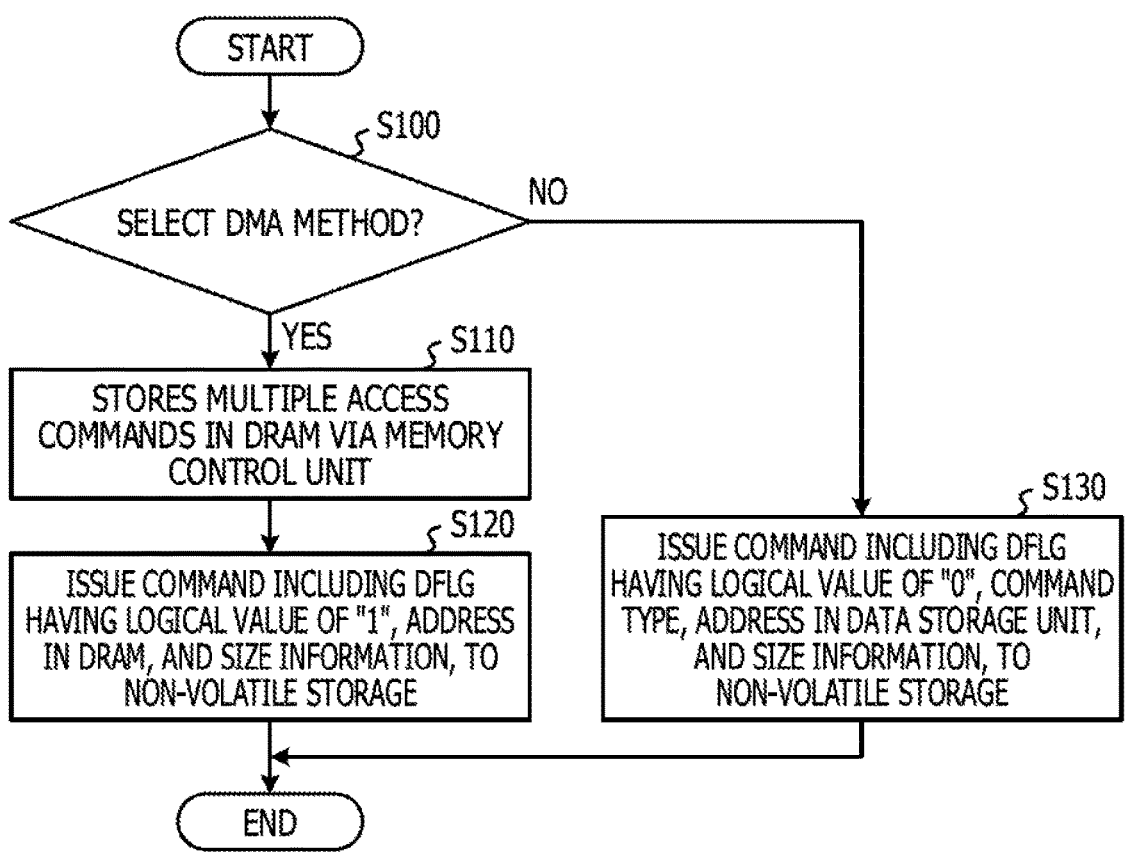
FIG. 4 illustrates an example of an operation of the CPU.

FIG. 4 illustrates an example of an operation of the CPU 220. Note that FIG. 4 illustrates an operation of the CPU 220 when issuing the command CMD1 to the non-volatile storage 102. In addition, an operation of the CPU 220 is not limited to the example illustrated in FIG. 4.

In step S100, the CPU 220 determines whether or not to select the DMA method as a transfer method of the access commands CMDa. When, for example, the number of commands that are the transfer targets is greater than or equal to a predetermined threshold value, the CPU 220 selects the DMA method as the transfer method for the access command CMDa. In addition, when, for example, the number of commands that are the transfer targets is less than the predetermined threshold value, the CPU 220 selects the PIO method as the transfer method of the access commands CMDa.

In this case, the threshold value is, for example, a minimum value of the number of commands beyond which the time taken to transfer all commands that are transfer targets by the DMA method is shorter than the time taken to transfer all commands that are transfer targets by the PIO method. Note that the threshold value may be set to any arbitrary value set by a user or the like of the host device 202.

In this way, out of the DMA method and the PIO method, the CPU 220 selects a method in which the time taken to transfer all the commands CMDa that are transfer targets is shorter. Then, when the DMA method is selected as the transfer method of the access commands CMDa, the CPU 220 moves the operation to step S110. When the CPU 220 does not select the DMA method as the transfer method for the access commands CMDa, namely, when the PIO method is selected as the transfer method for the access commands CMDa, the CPU 220 moves the operation to step S130.

In step S110, the CPU 220 stores the multiple access commands CMDa2 in the DRAM 260 via the memory control unit 240. Data structure of the access command CMDa2 is, for example, the same as or similar to a data structure obtained by omitting the flag DFLG from the access command CMDa1 illustrated in FIG. 3A.

Next, in step S120, the CPU 220 issues to the non-volatile storage 102, the command CMD1 that includes a flag DFLG having a logical value of "1", an address in the DRAM 260, and the size information. The CPU 220 issues, for example, the transfer preparation completion command CMDb1 illustrated in FIG. 3B to the non-volatile storage 102, as the command CMD1. The operation of the CPU 220 at the time of issuing the command CMD1 to the non-volatile storage 102 thus ends.

In step S130, the CPU 220 issues to the non-volatile storage 102, the command CMD1 that includes the flag DFLG having a logical value of "0", the command type, an address in the data storage units 180, and the size information. The CPU 220, for example, issues as the command CMD1, the access command CMDa1 illustrated in FIG. 3A to the non-volatile storage 102. The operation of the CPU 220 at the time of issuing the command CMD1 to the non-volatile storage 102 thus ends.

Figure 5:
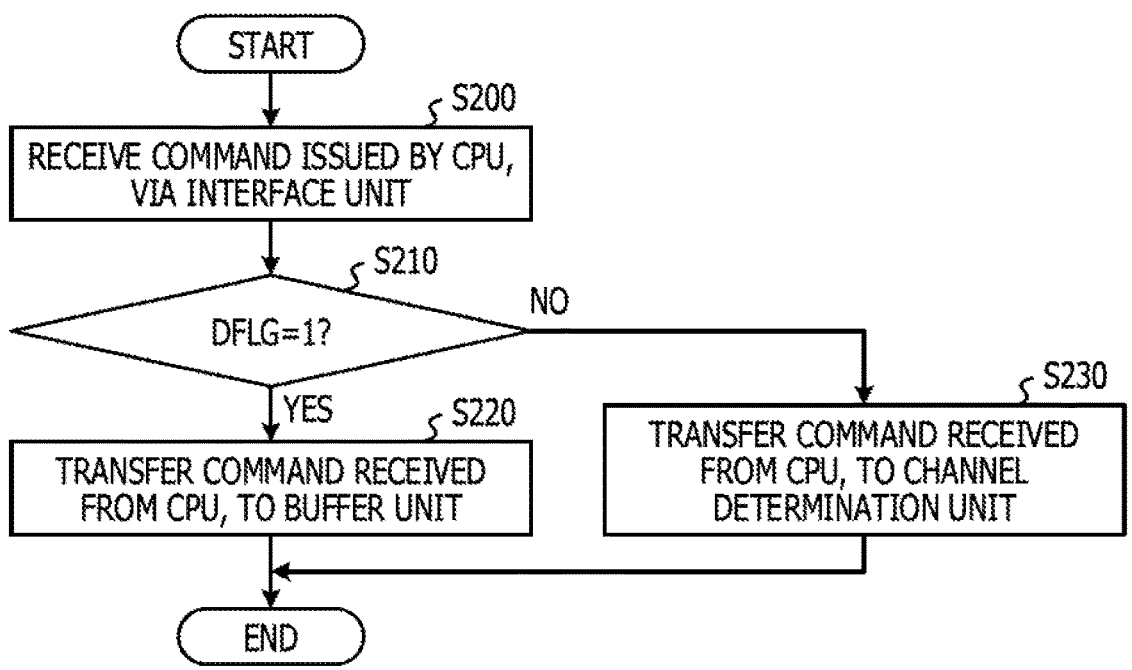
FIG. 5 illustrates an example of an operation of a type determination unit.

FIG. 5 illustrates an example of an operation of the type determination unit 120. Note that the operation of the type determination unit 120 is not limited to the example illustrated in FIG. 5.

In step S200, the type determination unit 120 receives the command CMD1 issued by the CPU 220 within the host device 202 to the non-volatile storage 102, via the interface unit 110.

Next, in step S210, the type determination unit 120 determines whether or not the flag DFLG of the command CMD1 received from the CPU 220 has the logical value of "1". Namely, the type determination unit 120 determines whether or not the command CMD1 received from the CPU 220 is the transfer preparation completion command CMDb1. This enables the type determination unit 120 to determine whether an access command CMDa is being transferred by the DMA method or not.

When the flag DFLG of the command CMD1 has the logical value of "1", the operation of the type determination unit 120 moves to step S220. On the contrary, when the flag DFLG of the command CMD1 does not have the logical value of "1", namely, when the flag DFLG of the command CMD1 has the logical value of "0", the operation of the type determination unit 120 moves to step S230.

In step S220, the type determination unit 120 transfers the command CMD1 received from the CPU 220 to the buffer unit 130. Namely, the type determination unit 120 transfers the transfer preparation completion command CMDb1 received from the CPU 220 to the buffer unit 130. The transfer preparation completion command CMDb1 is thereby stored in the buffer unit 130. Note that the type determination unit 120 may transfer the transfer preparation completion command CMDb1 after deleting therefrom the flag DFLG to the buffer unit 130, or may transfer the transfer preparation completion command CMDb1 retaining the flag DFLG to the buffer unit 130.

In step S230, the type determination unit 120 transfers the command CMD1 received from the CPU 220 to the channel determination unit 150. Namely, the type determination unit 120 transfers the access command CMDa1 received from the CPU 220 to the channel determination unit 150. The type determination unit 120, for example, deletes the flag DFLG from the access command CMDa1 received from the CPU 220, and transfers the access command CMDa1 from which the flag DFLG is deleted to the channel determination unit 150.

Figure 6:
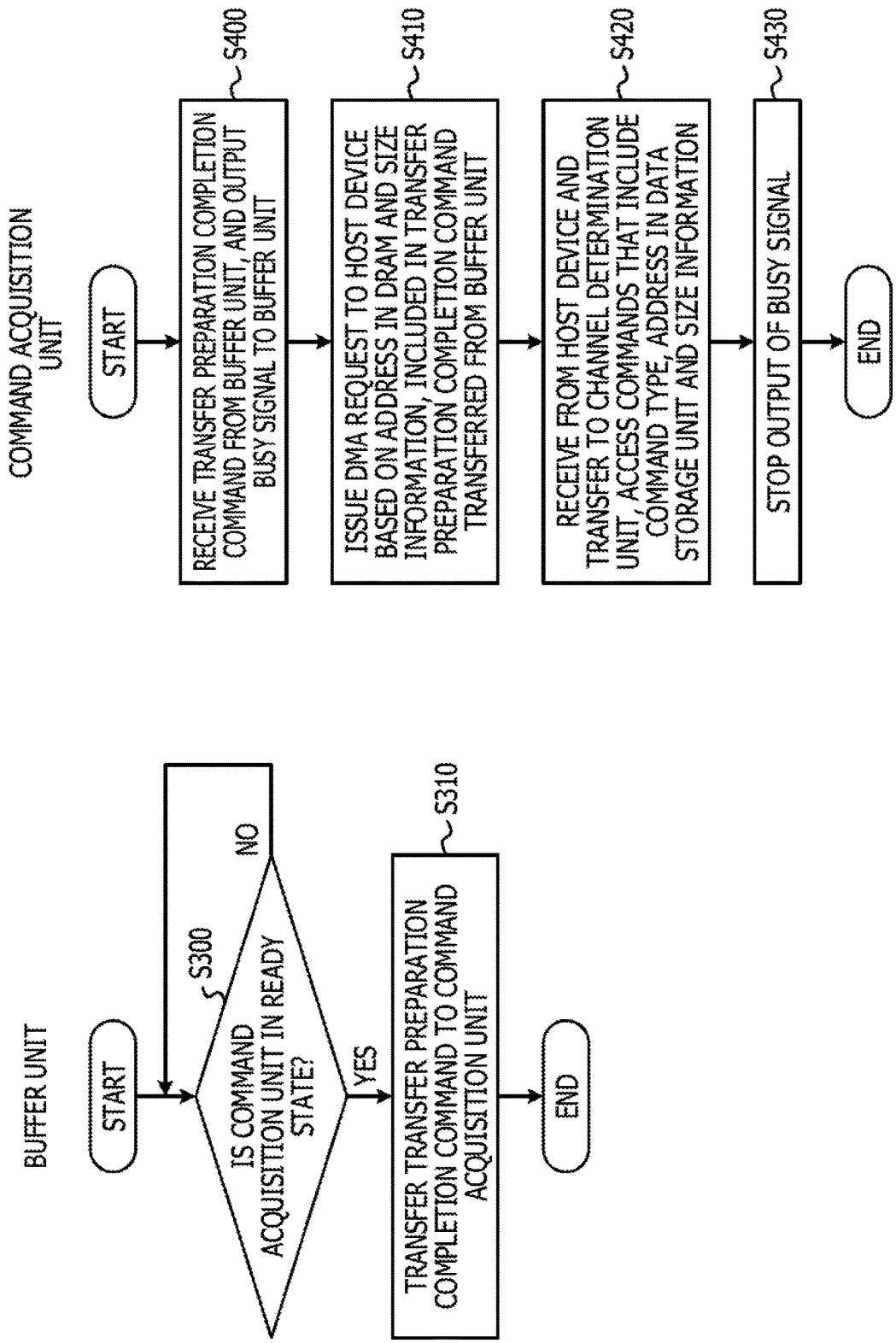
FIG. 6 illustrates examples of operations of a buffer unit and a command acquisition unit.

FIG. 6 illustrates examples of operations of the buffer unit 130 and the command acquisition unit 140.

In step S300, the buffer unit 130 determines whether or not the command acquisition unit 140 is in a ready state capable of receiving the transfer preparation completion command CMDb1. When, for example, a busy signal is received from the command acquisition unit 140 indicating that the command acquisition unit 140 is performing the transfer of the access commands CMDa2 to the channel determination unit 150, the buffer unit 130 determines that the command acquisition unit 140 is not in the ready state. Namely, when the busy signal is not output from the command acquisition unit 140, the buffer unit 130 determines that the command acquisition unit 140 is in the ready state.

When the command acquisition unit 140 is in the ready state, the operation of the buffer unit 130 moves to step S310. On the contrary, when the command acquisition unit 140 is not in the ready state, the operation of the buffer unit 130 returns to step S300. Namely, the buffer unit 130 is placed in a wait state regarding executing processing of step S310 until the command acquisition unit 140 returns to the ready state.

In step S310, the buffer unit 130 transfers the held transfer preparation completion command CMDb1 to the command acquisition unit 140. Note that the transfer preparation completion command CMDb1 retained in the buffer unit 130 is the command CMD1 transferred from the type determination unit 120 in step S220 illustrated in FIG. 5. When the command acquisition unit 140 receives the transfer preparation completion command CMDb1, the command acquisition unit 140 performs processing operations of steps S400, S410, S420, and S430.

In, for example, step S400, the command acquisition unit 140 receives the transfer preparation completion command CMDb1 from the buffer unit 130 and outputs the busy signal to the buffer unit 130 and the like. When, for example, the command acquisition unit 140 receives the transfer preparation completion command CMDb1 from the buffer unit 130, the command acquisition unit 140 asserts the busy signal.

Next, in step S410, the command acquisition unit 140 issues the DMA request DREQ to the memory control unit 240 within the host device 202, based on the transfer preparation completion command CMDb1 transferred from the buffer unit 130. The command acquisition unit 140, for example, generates the DMA request DREQ and issues the generated DMA request DREQ to the memory control unit 240 within the host device 202, based on an address in the DRAM 260 and the size information, out of information included in the transfer preparation completion command CMDb1.

Next, in step S420, the command acquisition unit 140 receives the access command CMDa2 that includes, command type, address in the data storage units 180, and the size information, from the host device 202, and transfers the access commands CMDa2 to the channel determination unit 150. The command acquisition unit 140, for example, acquires in sequence, the multiple access commands CMDa2 stored in the DRAM 260 in step S110 illustrated in FIG. 4, from the host device 200 by the DMA transfer based on the DMA request DREQ issued in step S410. Then, the command acquisition unit 140 transfers in sequence the multiple access commands CMDa2 acquired from the DRAM 260 within the host device 200 by the DMA transfer, to the channel determination unit 150. The command acquisition unit 140 performs processing of step S430, after transferring all the multiple access commands CMDa2 requested by the DMA request DREQ, to the channel determination unit 150.

In step S430, the command acquisition unit 140 stops output of the busy signal. The command acquisition unit 140, for example, negates the busy signal.

In this way, the transfer preparation completion command CMDb1 is transferred from the buffer unit 130 to the command acquisition unit 140 according to an operation state of the command acquisition unit 140. This suppresses the transfer preparation completion command CMDb1 to be transferred to the command acquisition unit 140 when the command acquisition unit 140 is not in a ready state capable of receiving the transfer preparation completion command CMDb1. Note that transfer of the transfer preparation completion command CMDb1 from the type determination unit 120 to the buffer unit 130 is performed regardless of the operation state of the command acquisition unit 140. This thereby enables the type determination unit 120 to efficiently receive the command CMD1 transferred from the host device 202.

Note that the operations of the buffer unit 130 and the command acquisition unit 140 are not limited to the examples illustrated in FIG. 6. The command acquisition unit 140, for example, may read the transfer preparation completion command CMDb1 from the buffer unit 130 when the command acquisition unit 140 is in a ready state, upon receipt of information indicating that the transfer preparation completion command CMDb1 is stored in the buffer unit 130.

Figure 7:
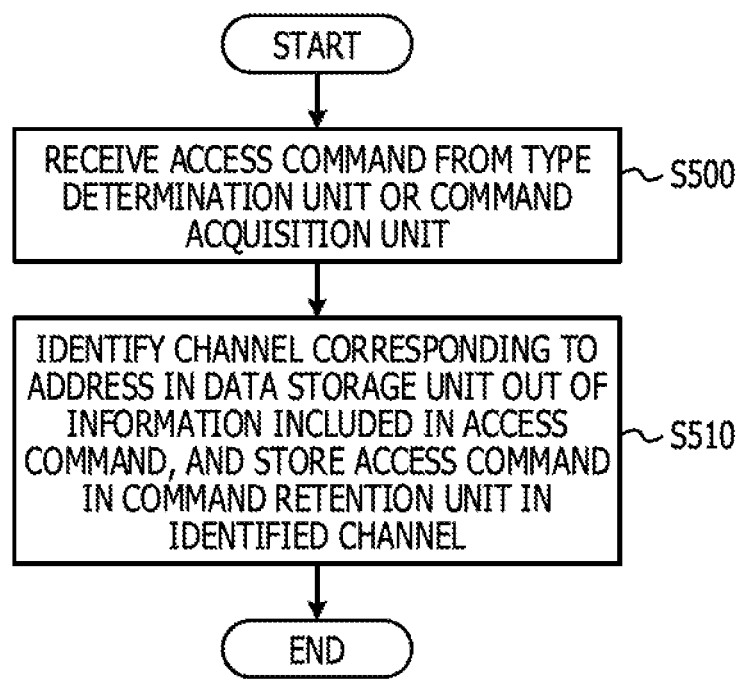
FIG. 7 illustrates an example of an operation of a channel determination unit.

FIG. 7 illustrates an example of an operation of the channel determination unit 150. Note that the operation of the channel determination unit 150 is not limited to the example illustrated in FIG. 7.

In step S500, the channel determination unit 150 receives the access command CMDa from the type determination unit 120 or the command acquisition unit 140. The channel determination unit 150, for example, receives the access command CMDa transferred from the type determination unit 120 in step S230 illustrated in FIG. 5. In addition, the channel determination unit 150 receives the access command CMDa transferred from the command acquisition unit 140 in step S420 illustrated in FIG. 6.

Next, in step S510, the channel determination unit 150 identifies the channels CH that corresponds to the address in the data storage unit 180 out of information included in the access command CMDa received in step S500. Then, the channel determination unit 150 stores the access command CMDa in the command retention unit 160 of the channel CH identified based on the access command CMDa. In this way, the channel determination unit 150 selects the command retention unit 160 as the storage destination of the access command CMDa received in step S500, based on an address in the data storage unit 180 out of the information included in the access command CMDa. The access command CMDa is thereby stored in the command retention unit 160 corresponding to the data storage unit 180 of the access target.

As above, in the embodiment illustrated in FIG. 2 to FIG. 7, the same advantageous effect as that of the embodiment illustrated in FIG. 1 is also obtained. The type determination unit 120 within the non-volatile storage 102 determines if the command CMD1 transferred from the CPU 220 within the host device 202 is the access command CMDa1 or the transfer preparation completion command CMDb1, for example. Then, when the command CMD1 is the access command CMDa1, the type determination unit 120 transfers the access commands CMDa1 transferred from the CPU 220, to the channel determination unit 150. When the command CMD1 is the transfer preparation completion command CMDb1, the type determination unit 120 stores the transfer preparation completion command CMDb1 transferred from the CPU 220 in the buffer unit 130.

The command acquisition unit 140 acquires the transfer preparation completion command CMDb1 retained in the buffer unit 130 and issues the DMA request DREQ to the host device 202, based on the transfer preparation completion command CMDb1. Then, the command acquisition unit 140 acquires the access command CMDa2 stored in the DRAM 260 within the host device 202, by the DMA transfer based on the DMA request DREQ, and transfers the acquired access command CMDa2 to the channel determination unit 150.

The channel determination unit 150 selects one out of the multiple channels CH based on the access command CMDa received from the type determination unit 120 or the command acquisition unit 140, and stores the access commands CMDa in the command retention unit 160 in the selected channel CH. In this way, the non-volatile storage 102 is compatible both with the DMA method based command transfer and the PIO method based command transfer. For this reason, the time taken to transfer the commands CMDa is reduced regardless of the number of commands CMDa transferred from the host device 202 to the non-volatile storage 102.

Figure 8:
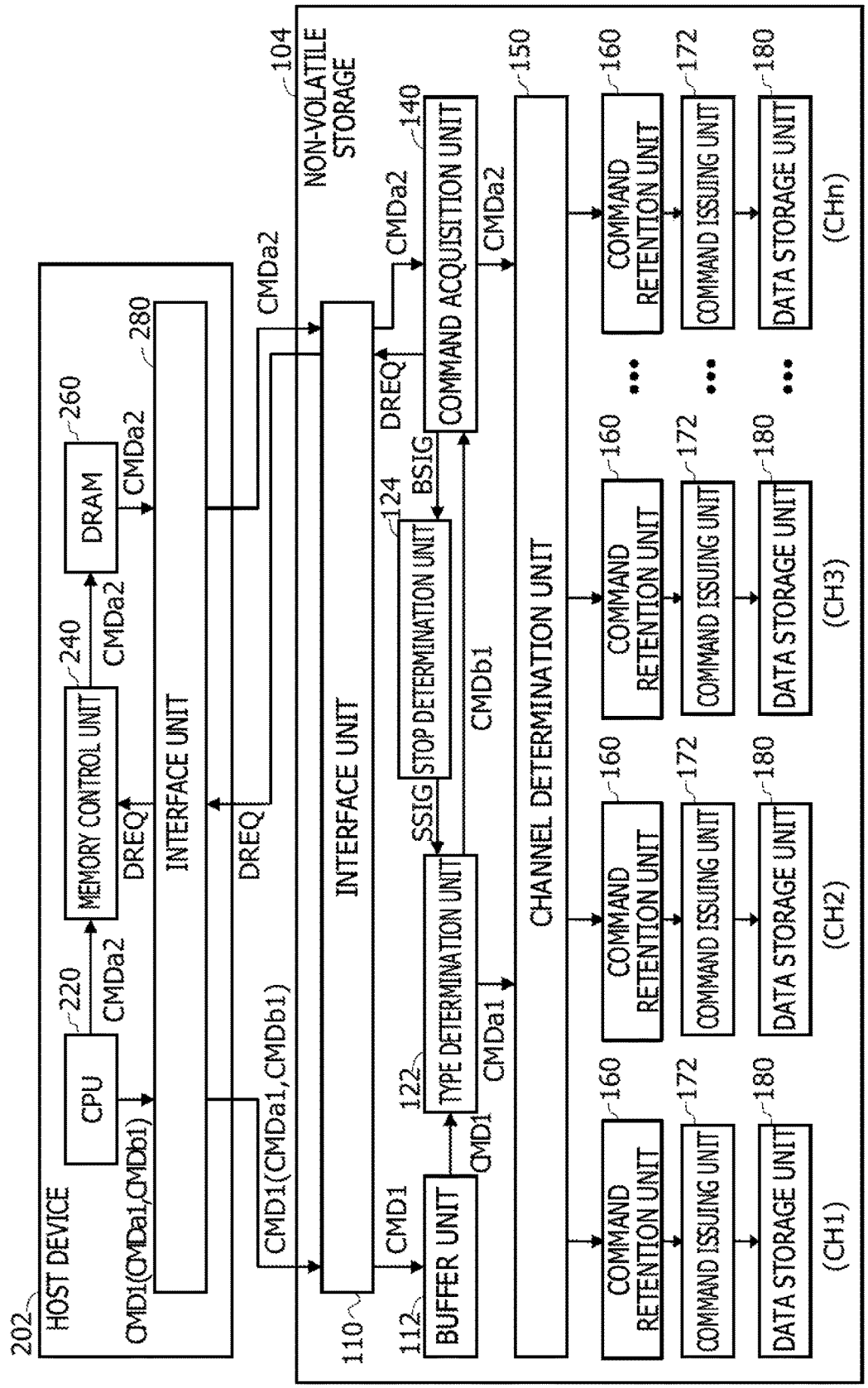
FIG. 8 illustrates another embodiment of a non-volatile storage and a processing method of the non-volatile storage.

FIG. 8 illustrates another embodiment of a non-volatile storage and a processing method of the non-volatile storage. The same symbols or similar symbols are assigned to the same elements as or elements similar to the elements described in FIG. 1 to FIG. 7, and the detailed descriptions thereof will be omitted. A non-volatile storage 104 illustrated in FIG. 8 is a non-volatile storage device such as the SSD. The non-volatile storage 104 is coupled to the host device 202. The host device 202 is the same as or similar to the host device 202 illustrated in FIG. 2.

In the non-volatile storage 104, a type determination unit 122 and a buffer unit 112 are provided in place of the type determination unit 120 and the buffer unit 130 illustrated in FIG. 2, and a stop determination unit 124 is added to the non-volatile storage 102 illustrated in FIG. 2. The other configuration of the non-volatile storage 104 is the same as or similar to that of the non-volatile storage 102 illustrated in FIG. 2.

The non-volatile storage 104 includes the interface unit 110, the buffer unit 112, the type determination unit 122, the stop determination unit 124, the command acquisition unit 140, and the channel determination unit 150, for example. Furthermore, in the same way as the non-volatile storage 102 illustrated in FIG. 2, the non-volatile storage 104 includes the multiple sets of command retention unit 160, command issuing units 172, and data storage units 180, respectively provided in the multiple channels CH.

The interface unit 110 is the same as or similar to the interface unit 110 illustrated in the FIG. 2. The interface unit 110 is an interface compliant with, for example, the PCI Express standard.

The buffer unit 112 is a buffer such as, for example, a FIFO. The buffer unit 112 retains the command CMD1 received from the host device 202, and transfers the command CMD1 that has been held to the type determination unit 122.

The type determination unit 122 is the same as or similar to the type determination unit 120 illustrated in FIG. 2, except that reading of the command CMD1 from the buffer unit 112 is stopped while a stop signal SSIG is received from the stop determination unit 124.

The type determination unit 122, for example, acquires the command CMD1 from the buffer unit 112 when output of the stop signal SSIG from the stop determination unit 124 is stopped. Then, the type determination unit 122 transfers the command CMD1, namely, the transfer preparation completion command CMDb1, to the command acquisition unit 140, when, for example, the type determination unit 122 determines the command CMD1 acquired from the buffer unit 112 to be the transfer preparation completion command CMDb1. Namely, the type determination unit 122 transfers the transfer preparation completion command CMDb1 received from the host device 202 to the command acquisition unit 140, when the command CMD1 received from the host device 202 via the buffer unit 112 is the transfer preparation completion command CMDb1.

In addition, the type determination unit 122 transfers the command CMD1 to the channel determination unit 150 when the command CMD1 is the access command CMDa1, namely, when the command CMD1 is not the transfer preparation completion command CMDb1. The access command CMDa1 is thereby stored in the command retention units 160 via the channel determination unit 150.

The stop determination unit 124 determines whether or not to stop transferring the command CMD1 retained in the buffer unit 112, to the type determination unit 122 based on an operation state of the command acquisition unit 140. The stop determination unit 124, for example, receives a busy signal BSIG from the command acquisition unit 140 when the command acquisition unit 140 is performing transfer of the access commands CMDa2 to the channel determination unit 150. Note that the busy signal BSIG is a signal indicating that the command acquisition unit 140 is performing transfer of the access commands CMDa2 to the channel determination unit 150.

When the busy signal BSIG is received, the stop determination unit 124 determines that the command acquisition unit 140 is not in a ready state capable of receiving the transfer preparation completion command CMDb1, and the stop determination unit 124 outputs the stop signal SSIG to the type determination unit 122. Namely, the stop signal SSIG is a signal for stopping transfer of the command CMD1 to the type determination unit 122. For example, when the busy signal BSIG is asserted, the stop determination unit 124 asserts the stop signal SSIG.

In addition, when output of the busy signal BSIG from the command acquisition unit 140 is stopped, the stop determination unit 124 determines that the command acquisition unit 140 is in a ready state capable of receiving the transfer preparation completion command CMDb1, and stops output of the stop signal SSIG. For example, when the busy signal BSIG is negated, the stop determination unit 124 negates the stop signal SSIG.

In this way, while the command acquisition unit 140 is performing transfer of the access commands CMDa2 to the command retention unit 160, the stop determination unit 124 determines that transfer of the command CMD1 retained in the buffer unit 112 to the type determination unit 122 is stopped.

The command acquisition unit 140 is the same as or similar to the command acquisition unit 140 illustrated in FIG. 2. The command acquisition unit 140 receives the transfer preparation completion command CMDb1 from the type determination unit 122, for example. Then, the command acquisition unit 140 issues the DMA request DREQ to the memory control unit 240 within the host device 202, based on the transfer preparation completion command CMDb1. Out of the access commands CMDa2 stored in the DRAM 260, the access commands CMDa2 that are requested by the DMA request DREQ are thereby DMA-transferred to the command acquisition unit 140. The command acquisition unit 140 transfers in sequence the multiple access commands CMDa2 that have been DMA-transferred from the DRAM 260, to the channel determination unit 150. The multiple access commands CMDa2 are thereby stored in the command retention unit 160 via the channel determination unit 150.

In addition, the command acquisition unit 140 outputs the busy signal BSIG to the stop determination unit 124 and the like, when the transfer preparation completion command CMDb1 is received from the type determination unit 122. The command acquisition unit 140, for example, asserts the busy signal BSIG when the command acquisition unit 140 receives the transfer preparation completion command CMDb1 from the type determination unit 122. Then, the command acquisition unit 140 stops output of the busy signal BSIG, after transferring all of the multiple access commands CMDa2 acquired by the DMA transfer to the channel determination unit 150. The command acquisition unit 140, for example, negates the busy signal BSIG, after transferring all the multiple access commands CMDa2 acquired by the DMA transfer to the channel determination unit 150.

In this way, the command acquisition unit 140 outputs the busy signal BSIG to the stop determination unit 124 and the like, when the command acquisition unit 140 is performing transfer of the multiple access commands CMDa2 acquired by the DMA transfer to the channel determination unit 150. Note that the operation of the command acquisition unit 140 is explained by replacing the buffer unit 130 in the description of each of steps S in the command acquisition unit 140 illustrated in FIG. 6 with the type determination unit 120 (however, an output destination of the busy signal BSIG to be replaced with the stop determination unit 124).

The channel determination unit 150, the command retention units 160, the command issuing units 172, and the data storage units 180 are the same as or similar to the channel determination unit 150, the command retention units 160, the command issuing units 172, and the data storage units 180, respectively, illustrated in FIG. 2.

Note that a configuration of the non-volatile storage 104 is not limited to the example illustrated in FIG. 8. The stop determination unit 124 may be provided within, for example, the type determination unit 122 or may be provided within the buffer unit 112. Alternatively, the stop determination unit 124 may be omitted. In this case, the type determination unit 122 may receive, as the stop signal SSIG, the busy signal BSIG from the command acquisition unit 140. In addition, the buffer unit 112 may receive the busy signal BSIG from the command acquisition unit 140 for determining whether or not to stop transferring the command CMD1 to the type determination unit 122 based on the busy signal BSIG.

Figure 9:
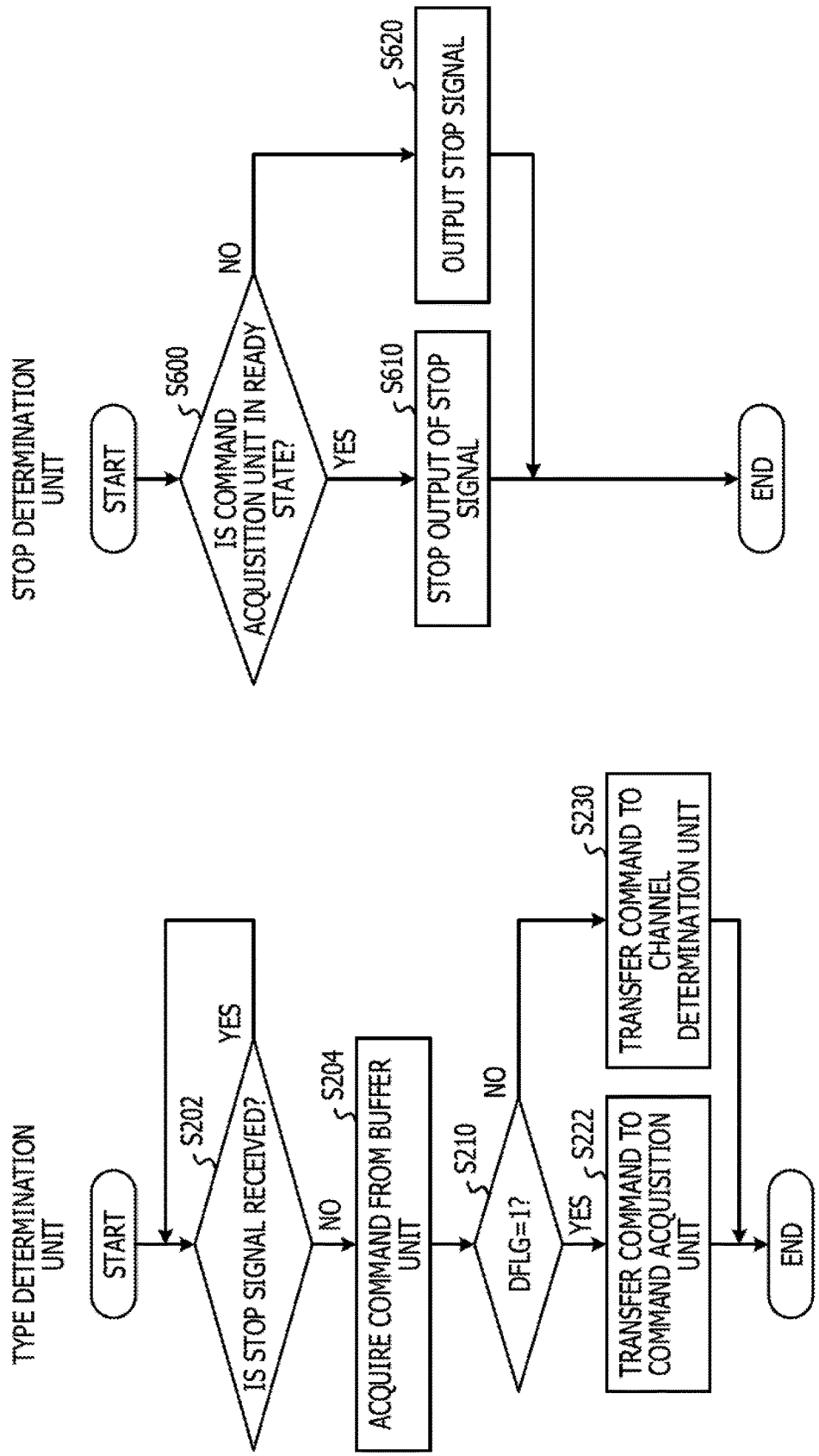
FIG. 9 illustrates an example of operations of a type determination unit and a stop determination unit.

FIG. 9 illustrates examples of operations of the type determination unit 122 and the stop determination unit 124. Note that the operations of the type determination unit 122 and the stop determination unit 124 are not limited to the examples illustrated in FIG. 9. First, the operation of the stop determination unit 124 will be described.

In step S600, the stop determination unit 124 determines whether or not the command acquisition unit 140 is in a ready state capable of receiving the transfer preparation completion command CMDb1. When, for example, a busy signal BSIG is received from the command acquisition unit 140, the stop determination unit 124 determines that the command acquisition unit 140 is not in the ready state. Namely, the stop determination unit 124 determines that the command acquisition unit 140 is in the ready state when no busy signal is output from the command acquisition unit 140.

When the command acquisition unit 140 is in the ready state, the operation of the stop determination unit 124 moves to step S610. On the contrary, when the command acquisition unit 140 is not in the ready state, the operation of the stop determination unit 124 moves to step S620.

In step S610, the stop determination unit 124 stops output of the stop signal SSIG. The stop determination unit 124 negates the stop signal SSIG, for example.

In step S620, the stop determination unit 124 outputs the stop signal SSIG to the type determination unit 122 and the like. The stop determination unit 124 asserts the stop signal SSIG, for example. When the stop determination unit 124 is stopping output of the stop signal SSIG, the type determination unit 122 is placed in a wait state regarding executing processing of steps S204, S210, S222, and S230. Next, the operation of the type determination unit 122 will be described.

In step S202, the type determination unit 122 determines whether or not the stop signal SSIG is received from the stop determination unit 124. The type determination unit 122 determines whether or not the stop signal SSIG is asserted, for example. When the type determination unit 122 is not receiving the stop signal SSIG, the operation of the type determination unit 122 moves to step S204. On the contrary, when the type determination unit 122 is receiving the stop signal SSIG, the operation of the type determination unit 122 returns to step S202. Namely, the type determination unit 122 is placed in a wait state regarding executing the processing of step S204 until the command acquisition unit 140 returns to a ready state capable of receiving the transfer preparation completion command CMDb1.

In step S204, the type determination unit 122 acquires from the buffer unit 112 the command CMD1 issued to the non-volatile storage 104 by the CPU 220 within the host device 202.

Next, in step S210, the type determination unit 122 determines whether or not the flag DFLG of the command CMD1 received from the CPU 220 via the buffer unit 112 has the logical value of "1". Namely, the type determination unit 122 determines whether or not the command CMD1 received from the CPU 220 via the buffer unit 112 is the transfer preparation completion command CMDb1. This enables the type determination unit 122 to determine whether or not the access commands CMDa are transferred by the DMA method.

When the flag DFLG of the command CMD1 has the logical value of "1", the operation of the type determination unit 122 moves to step S222. On the contrary, when the flag DFLG of the command CMD1 does not have the logical value of "1", namely, when the flag DFLG of the command CMD1 has the logical value of "0", the operation of the type determination unit 122 moves to step S230.

In step S222, the type determination unit 122 transfers the command CMD1 received from the CPU 220 via the buffer unit 112 to the command acquisition unit 140. Namely, the type determination unit 122 transfers the transfer preparation completion command CMDb1 received from the CPU 220 via the buffer unit 112 to the command acquisition unit 140. Note that the type determination unit 122 may transfer the transfer preparation completion command CMDb1 after deleting therefrom the flag DFLG to the command acquisition unit 140, or may transfer the transfer preparation completion command CMDb1 retaining the flag DFLG to the command acquisition unit 140.

In step S230, the type determination unit 122 transfers the command CMD1 received from the CPU 220 via the buffer unit 112 to the channel determination unit 150. Namely, the type determination unit 122 transfers the access command CMDa1 received from the CPU 220 via the buffer unit 112, to the channel determination unit 150. The type determination unit 122, for example, deletes the flag DFLG of the access command CMDa1 received from the CPU 220 via the buffer unit 112 and transfers the access command CMDa1 after deleting therefrom the flag DFLG, to the channel determination unit 150.

In this way, the type determination unit 122 is placed in a wait state regarding processing (step S204) for acquiring the command CMD1 from the buffer unit 112 until the command acquisition unit 140 returns to the ready state capable of receiving the transfer preparation completion command CMDb1. This enables the type determination unit 122 to avoid transferring the access command CMDa1 to the channel determination unit 150 while the command acquisition unit 140 is transferring the multiple access commands CMDa2 stored in the DRAM 260 to the channel determination unit 150. This thereby enables interruption of the storage process of the multiple access commands CMDa2 transferred by the DMA method into the command retention units 160, by the storage process of the access command CMDa1 transferred by the PIO method into the command retention units 160, to be avoided.

Figure 10:
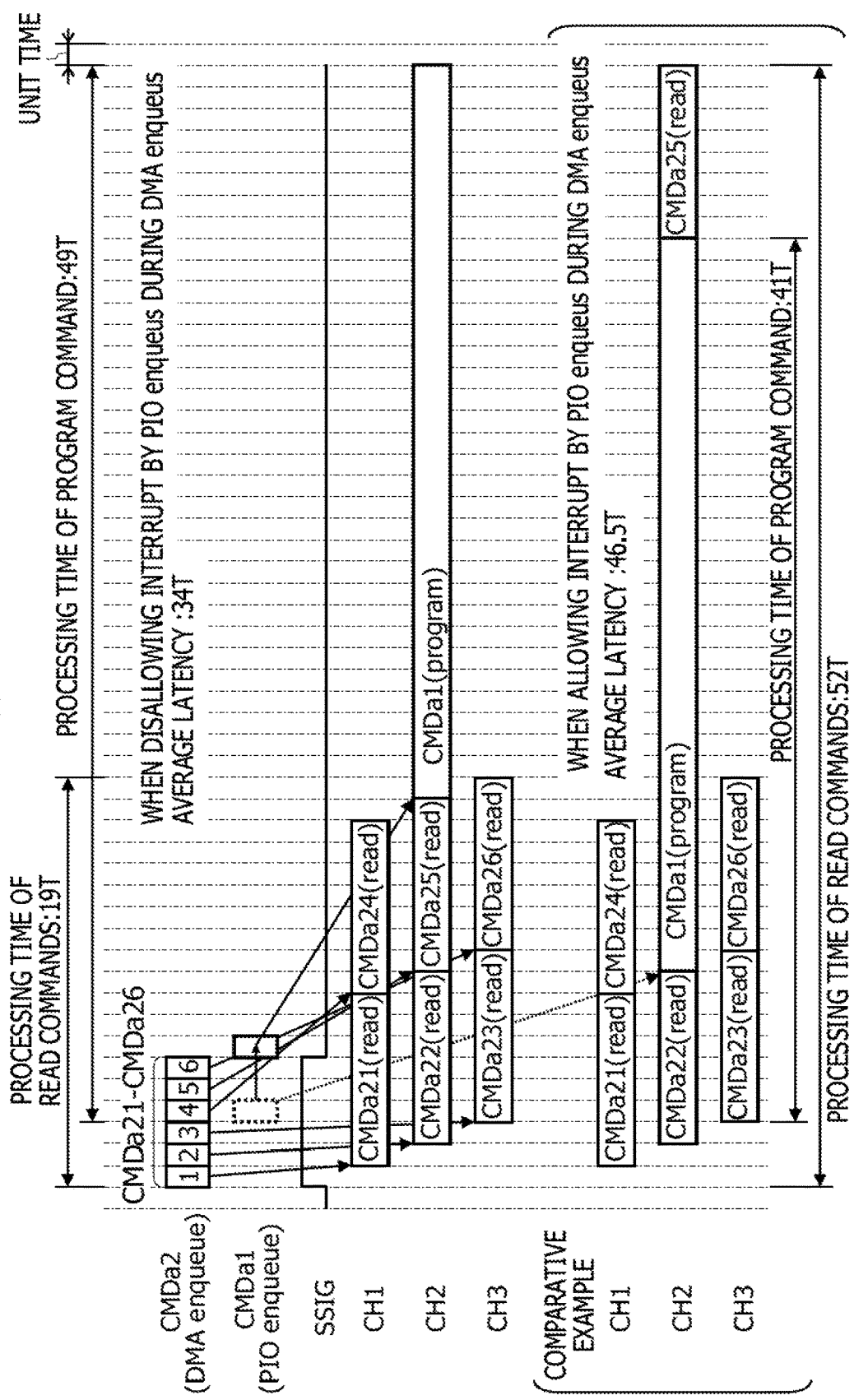
FIG. 10 illustrates an example of an operation of the non-volatile storage.

FIG. 10 illustrates an example of an operation of the non-volatile storage 104. In FIG. 10, as a comparative example, an example of the operation of the non-volatile storage 102 illustrated in FIG. 2 is illustrated in parentheses. In the example illustrated in FIG. 10, six access commands CMDa2 (CMDa21, CMDa22, CMDa23, CMDa24, CMDa25, and CMDa26) are DMA-transferred and are stored in the command retention units 160. Hereinafter, processing for storing the multiple access commands CMDa2 transferred by the DMA method in the command retention units 160 is also referred to as DMA enqueue. Processing for storing, the access commands CMDa1 transferred by the PIO method in the command retention units 160, is also referred to as PIO enqueue.

In the DMA enqueue, the six access commands CMDa21, CMDa22, CMDa23, CMDa24, CMDa25, and CMDa26 are stored in the command retention units 160 in sequence. For example, the access commands CMDa21 and CMDa24 are stored in the command retention unit 160 of the channel CH1 in this order, and the access commands CMDa22 and CMDa25 are stored in the command retention unit 160 of the channel CH2 in this order. In addition, the access commands CMDa23 and CMDa26 are stored in the command retention unit 160 of the channel CH3 in this order. Note that the stop signal SSIG is asserted to a high logic level during the DMA enqueue.

Then, the access command CMDa1 is stored in the buffer unit 112 at a timing (a dashed rectangle in FIG. 10) approximately equal to the timing at which the access command CMDa24 is stored in the command retention units 160. Reading of the access commands CMDa1 from the buffer unit 112 is placed in a wait state until the stop signal SSIG is negated. Namely, the PIO enqueue is placed in a wait state until the stop signal SSIG is negated. Then, when the access command CMDa26 is stored in the command retention units 160 and the stop signal SSIG is negated, the access commands CMDa1 is read from the buffer unit 112 and is stored in the command retention unit 160 of the channel CH2.

In this way, when an interrupt by the PIO enqueue is disallowed during the DMA enqueue, the access commands CMDa22, CMDa25, and CMDa1 are stored in the command retention unit 160 of the channel CH2 in this order.

Therefore, in the channel CH1, processing for reading data, based on the access commands CMDa21 and CMDa24, is performed in the order of the access commands CMDa21 and CMDa24. Note that "read" indicated in parentheses in FIG. 10 signifies that the access command CMDa2 is a read command and "program" indicated in parentheses signifies that the access command CMDa1 is a program command.

In addition, in the channel CH2, processing for reading data, based on the access commands CMDa22 and CMDa25, is performed in the order of the access commands CMDa22 and CMDa25. Then, after the processing for reading data based on the access command CMDa25 is completed, processing for writing data based on the access command CMDa1 is performed.

In the channel CH3, processing for reading data, based on the access commands CMDa23 and CMDa26, is performed in the order of the access commands CMDa23 and CMDa26.

In the example illustrated in FIG. 10, when setting unit time T, processing time of the access commands CMDa21 to CMDa26, namely, processing time of the read commands is 19 T. Note that processing time of the access commands CMDa2 transferred by the DMA method is the time from, the start of storing the access commands CMDa2, that are transfer targets, in the command retention units 160, to the completion of processing based on all the access commands CMDa2 that are transfer targets.

In addition, processing time of the access commands CMDa1, namely, processing time of the program commands, is 49 T. Note that the processing time of the access command CMDa1, which is transferred by the PIO method, is time from the start of storing each access command CMDa1 in the buffer unit 112, to the completion of processing based on each access command CMDa1. When an average latency is defined as an average value of the processing time of the access commands CMDa21 to CMDa26 and the processing time of the access commands CMDa1, the average latency is 34 T.

Note that the comparative example allows an interrupt by the PIO enqueue during the DMA enqueue. Therefore, in the comparative example, the access command CMDa1 is stored in the command retention unit 160 of the channel CH2 at a timing (the dashed rectangle in FIG. 10) approximately equal to the timing at which the access command CMDa24 is stored in the command retention units 160. Namely, the access command CMDa1 is stored in the command retention unit 160 of the channel CH2 before the access command CMDa25 is stored in the command retention unit 160 of the channel CH2.

Accordingly, when an interrupt by the PIO enqueue during the DMA enqueuer is allowed, the access commands CMDa22, CMDa1, and CMDa25 are stored in the command retention unit 160 of the channel CH2 in this order. Therefore, in the channel CH2, processing for writing data based on the access commands CMDa1 is performed, after processing for reading data based on the access command CMDa22 is completed. Then, after the processing for writing data is completed based on the access command CMDa1, processing for reading data based on the access command CMDa25 is performed.

In this case, processing time of the access commands CMDa21 to CMDa26, namely, processing time of the read commands, is 52 T. In addition, processing time of the access command CMDa1, namely, processing time of the program command is 41 T. Note that processing time of the access command CMDa1, which is transferred by the PIO method, is the time from, the start of storing each access command CMDa1 in the command retention unit 160, to the completion of processing based on the relevant access command CMDa1. An average latency, which is an average value of the processing time of the access commands CMDa21 to CMDa26 and the processing time of the access command CMDa1, is 46.5 T.

In this way, in the example illustrated in FIG. 10, when an interrupt by the PIO enqueue during the DMA enqueuer is disallowed, the average latency is reduced compared with a case in which an interrupt by the PIO enqueue during the DMA enqueuer is allowed. This, accordingly, enables processing speed of the non-volatile storage 104 to be improved, in such a case in which processing is performed in parallel based on the multiple access commands CMDa2 that are DMA-transferred, compared with the non-volatile storage 102 illustrated in FIG. 2.

As above, the same advantageous effect as that of the embodiments illustrated in FIG. 1 to FIG. 7 is also obtained in the embodiment illustrated in FIG. 8 to FIG. 10. The non-volatile storage 104 is compatible both with the command transfer based on the DMA method and the command transfer based on the PIO method, for example. This thereby enables the non-volatile storage 104 to reduce the time taken to transfer the commands CMDa, regardless of the number of the commands CMDa transferred from the host device 202 to the non-volatile storage 104.

Furthermore, while the command acquisition unit 140 is performing transfer of the access commands CMDa2 to the channel determination unit 150, the type determination unit 122 stops reading the command CMD1 retained in the buffer unit 112. This thereby enables storage of the access command CMDa1 transferred by the PIO method in the command retention unit 160 while the multiple access commands CMDa2 transferred by the DMA method are being stored in the command retention units 160, to be avoided. As a result, this enables an increase in the time taken to complete processing based on the multiple access commands CMDa2 transferred by the DMA method, to be suppressed.

Figure 11:
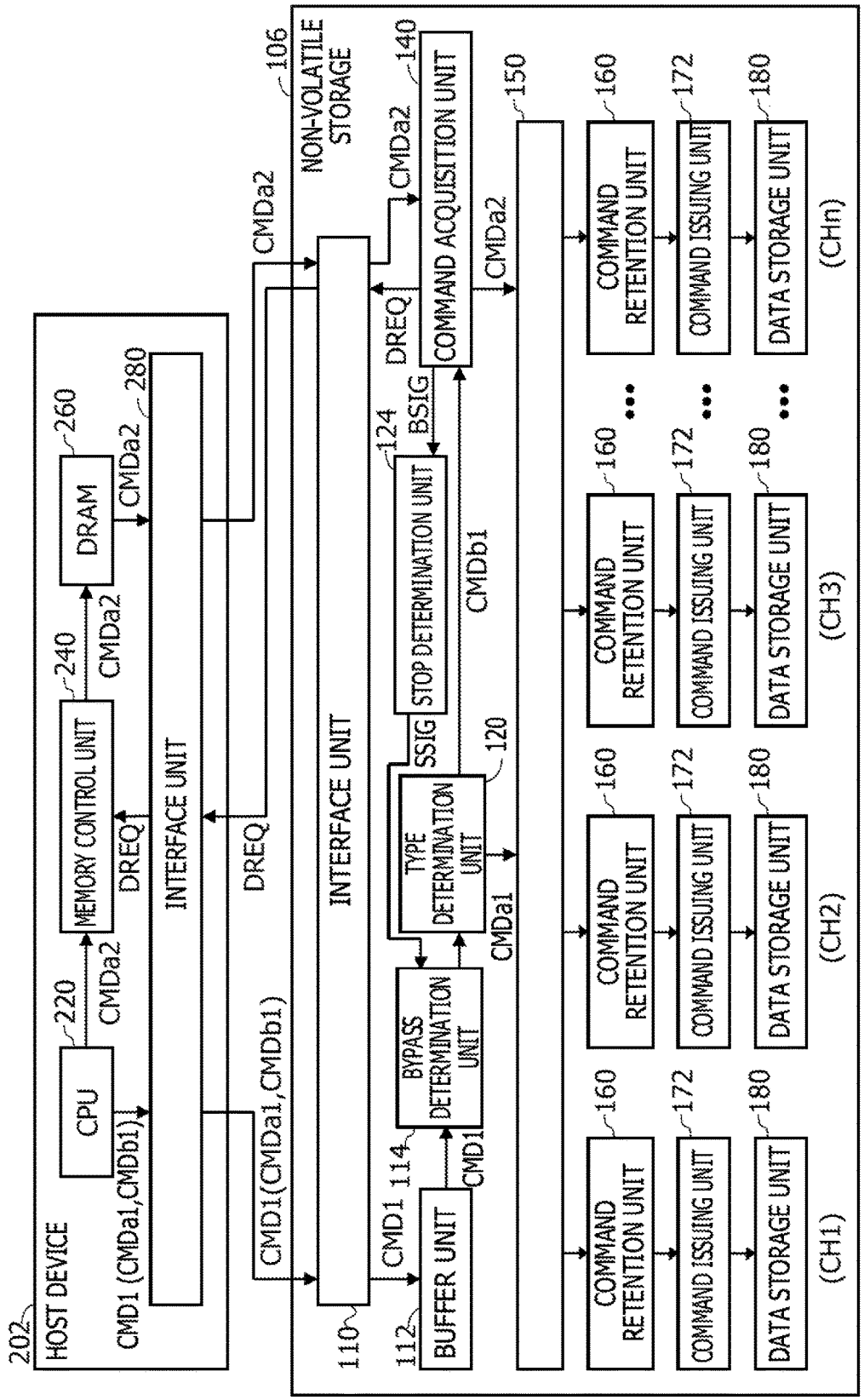
FIG. 11 illustrates another embodiment of a non-volatile storage and a processing method of the non-volatile storage.

FIG. 11 illustrates another embodiment of a non-volatile storage and a processing method of the non-volatile storage. The same symbols or similar symbols are assigned to the same elements as or elements similar to the elements described in FIG. 1 to FIG. 10, and the detailed descriptions thereof will be omitted. A non-volatile storage 106 illustrated in FIG. 11 is a non-volatile storage device such as the SSD. The non-volatile storage 106 is coupled to the host device 202. The host device 202 is the same as or similar to the host device 202 illustrated in FIG. 8. Note that there are cases in which the CPU 220 within the host device 202 illustrated in FIG. 11 issues the access command CMDa1 obtained by adding priority information to the access command CMDa1 illustrated in FIG. 3A, to the non-volatile storage 106. The priority information is information indicating that the access command CMDa1 is processed with a priority to the transfer preparation completion command CMDb1.

In the non-volatile storage 106, the type determination unit 120 is provided in place of the type determination unit 122 illustrated in FIG. 8, and a bypass determination unit 114 is added to the non-volatile storage 104 illustrated in FIG. 8. The other configuration of the non-volatile storage 106 is the same as or similar to that of the non-volatile storage 104 illustrated in FIG. 8.

The non-volatile storage 106 includes the interface unit 110, the buffer unit 112, the bypass determination unit 114, the type determination unit 120, the stop determination unit 124, the command acquisition unit 140, and the channel determination unit 150, for example. Furthermore, similarly to the non-volatile storage 104 illustrated in FIG. 8, the non-volatile storage 106 includes the multiple command retention units 160, the multiple command issuing units 172, and the multiple data storage units 180, which are provided for the respective multiple channels CH.

The interface unit 110 and the buffer unit 112 are the same as or similar to the interface unit 110 and the buffer unit 112, respectively, illustrated in the FIG. 8.

The bypass determination unit 114 reads from the buffer unit 112 the command CMD1 to be transferred to the type determination unit 120. The bypass determination unit 114 then determines whether or not the commands CMD1 read from the buffer unit 112 include the priority information. When a command CMD1 read from the buffer unit 112 includes the priority information, the bypass determination unit 114 transfers the command CMD1 read from the buffer unit 112 to the type determination unit 120, regardless of the determination result by the stop determination unit 124. Namely, when a command CMD1 read from the buffer unit 112 includes the priority information, the bypass determination unit 114 transfers the command CMD1 read from the buffer unit 112 to the type determination unit 120, regardless of a state of the stop signal SSIG.

In addition, when the command CMD1 read from the buffer unit 112 includes no priority information, the bypass determination unit 114 performs transfer of the command CMD1 read from the buffer unit 112 to the type determination unit 120 based on a determination result obtained by the stop determination unit 124. For example, when the command CMD1 read from the buffer unit 112 includes no priority information, the bypass determination unit 114 is placed in a wait state regarding transfer of the command CMD1 read from the buffer unit 112 to the type determination unit 120, during the time period in which the stop signal SSIG is asserted. In addition, when the command CMD1 read from the buffer unit 112 includes no priority information, if the stop signal SSIG is negated, the bypass determination unit 114 transfers the command CMD1 read from the buffer unit 112 to the type determination unit 120.

In this way, the command CMD1 that includes the priority information indicating a processing priority over the transfer preparation completion command CMDb1 is transferred to the type determination unit 120, regardless of the determination result by the stop determination unit 124. This thereby enables a delay in processing based on the access command CMDa1 having a higher priority than the transfer preparation completion command CMDb1, to be suppressed.

The type determination unit 120 is the same as or similar to the type determination unit 120 illustrated in FIG. 2. For example, when the command CMD1 that is transferred from the bypass determination unit 114 is the transfer preparation completion command CMDb1, the type determination unit 120 transfers the transfer preparation completion command CMDb1 to the command acquisition unit 140. In addition, when the command CMD1 is the access command CMDa1, the type determination unit 120 transfers the access command CMDa1 to the channel determination unit 150.

The stop determination unit 124 is the same as or similar to the stop determination unit 124 illustrated in FIG. 8. Note that the stop determination unit 124 outputs the stop signal SSIG to the bypass determination unit 114. The command acquisition unit 140 is the same as or similar to the command acquisition unit 140 illustrated in FIG. 8. In addition, the channel determination unit 150, the command retention units 160, the command issuing units 172, and the data storage units 180 are the same as or similar to the channel determination unit 150, the command retention units 160, the command issuing units 172, and the data storage units 180, respectively, illustrated in FIG. 8.

Note that a configuration of the non-volatile storage 106 is not limited to the example illustrated in FIG. 11. The stop determination unit 124 may be provided within, for example, the bypass determination unit 114. Alternatively, the stop determination unit 124 may be omitted. In this case, the bypass determination unit 114 may receive, as the stop signal SSIG, the busy signal BSIG from the command acquisition unit 140.

As above, the same advantageous effect as that of the embodiment illustrated in FIG. 8 to FIG. 10 is also obtained in the embodiment illustrated in FIG. 11. For example, the non-volatile storage 106 is compatible both with command transfer based on the DMA method and that based on the PIO method. This accordingly enables the time taken to transfer the commands CMDa from the host device 202 to the non-volatile storage 106 to be shortened, regardless of the number of the commands CMDa to be transferred. In addition, the bypass determination unit 114 is placed in a wait state regarding transfer of the command CMD1 retained in the buffer unit 112 to the type determination unit 122 while the command acquisition unit 140 is performing transfer of the access commands CMDa2 to the channel determination unit 150. Accordingly, this enables an increase in the time taken to complete processing based on the multiple access commands CMDa2 transferred by the DMA method, to be suppressed.

Furthermore, the bypass determination unit 114 transfers the command CMD1 that includes the priority information indicating a processing priority over the transfer preparation completion command CMDb1, to the type determination unit 120, regardless of the determination result by the stop determination unit 124. This thereby enables a delay in processing based on the access command CMDa1 having a higher priority than the transfer preparation completion command CMDb1, to be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An access control method comprising:
   first determining, by a host device with a memory and provided in a system including a storage device with a storage, a number of a plurality of commands to be continuously transferred from the host device to the storage device;
   when the number of the plurality of commands is greater than or equal to a threshold value, storing the plurality of commands in the memory in the host device as first commands and first transferring, from the host device to the storage device, a transfer preparation completion command indicating that preparation for transferring of the first commands is completed, and when the number of the plurality of commands is less than the threshold value, second transferring, in sequence, from the host device to the storage device, the plurality of commands as second commands;
   first receiving, by the storage device, a command from the host device;
   when the received command is the transfer preparation completion command,
      transmitting, from the storage device to the host device, based on the transfer preparation completion command, a direct memory access request to request a direct memory access transfer of the first commands stored in the memory in the host device,
      second receiving, by the storage device, the first commands which are transferred from the memory in the host device by the direct memory access transfer based on the direct memory access request, and
      accessing the storage, by the storage device, based on each of the first commands received in the second receiving, and
   when the received command is one of the second commands, accessing the storage, by the storage device, based on the one of the second commands.

2. The method according to claim 1, further comprising:
   second determining the received command is the transfer preparation completion command when the transfer preparation completion command includes information indicating that the second commands are transferred by the direct memory access transfer.

3. A storage device configured to access a storage, the storage device comprising:
   an interface circuit coupled to a host device with a memory and provided in a system including a storage device with a storage, the host device configured to, when the number of the plurality of commands is greater than or equal to a threshold value, store the plurality of commands in the memory in the host device as first commands and execute a first transferring, from the host device to the storage device, a transfer preparation completion command indicating that preparation for transferring of the first commands is completed, and when the number of the plurality of commands is less than the threshold value, execute a second transferring, in sequence, from the host device to the storage device, the plurality of commands as second commands, and the interface circuit configured to receive a command from the host device; and
   circuitry configured to:
      perform first determination processing, the first determination processing determining whether the command received from the host device via the interface is one of the second commands or the transfer preparation completion command,
      perform acquisition processing when it is determined that the received command is the transfer preparation completion command by the first determination processing, the acquisition processing including:

transmitting, based on the transfer preparation completion command, a direct memory access request to request a direct memory access transfer of the first commands stored in the memory in the host device to the host device, and acquiring the first commands which are transferred from the memory in the host device by direct memory access transfer based on the direct memory access request, and accessing the storage, based on each of the first commands, and accessing the storage based on the one of the second commands when it is determined that the received command is the one of the second commands by the first determination processing.

4. The storage device according to claim 3, further comprising:

a first buffer to store therein an access command that is the command received from the host device or the first commands acquired by the acquisition processing, wherein the circuitry is configured to:

acquire, as a processing target command, the received access command or each of the first commands from the first buffer, and access the storage, based on the acquired processing target command.

5. The storage device according to claim 4, further comprising:

a second buffer to store therein the command received from the host device, wherein the circuitry is configured to perform second determination processing, and the second determination processing determines, based on a processing state of the acquisition processing, whether or not to supply the received command stored in the second buffer to the first determination processing.

6. The storage device according to claim 5, wherein the acquisition processing includes transfer processing for transferring the acquired plurality of access commands to the first buffer, and the circuitry is configured to:

determine that the received command stored in the third buffer is not to be supplied to the first determination processing, while the transfer processing is being performed by the acquisition processing.

7. The storage device according to claim 5, wherein the circuitry is configured to:

read a command from the third buffer, supply the read command to the first determination processing, regardless of a determination result obtained by the second determination processing, when the read command includes priority information indicating the priority thereof over the transfer preparation completion command, and execute supplying the read command to the first determination processing based on a determination result obtained by the second determination processing when the read command does not include the priority information.

8. The storage device according to claim 4, wherein the first buffer, an access control circuit to execute an access to the storage, and the storage are provided for each of a plurality of channels, and the circuitry is configured to:

select one out of the plurality of channels, based on the access command that is the command received from the host device or the first commands acquired by the acquisition processing, and store, in the first buffer in the selected channel, the access command that is the command received from the host device or the first commands acquired by the acquisition processing.

9. The storage device according to claim 3, further comprising:

a second buffer, wherein the circuitry is configured to:

store, in the second buffer, the transfer preparation completion command received from the host device, when it is determined that the received command is the transfer preparation completion command, and the acquisition processing includes acquiring the transfer preparation completion command from the second buffer.

10. A system including:

a host device including a processor and a memory; and a storage device including circuitry, a storage and an interface circuit coupled to the host device, the storage device accessing the storage, the processor of the host device is configured to:

determine a number of a plurality of access commands to be continuously transferred from the host device to the storage device, when the number of the plurality of commands is greater than or equal to a threshold value, store the plurality of commands in the memory in the host device as first commands and transfer, from the host device to the storage device, a transfer preparation completion command indicating that preparation for transferring of the first commands is completed, and when the number of the plurality of commands is less than the threshold value, transfer, in sequence, from the host device to the storage device, the plurality of access commands as second commands, and the circuitry of the storage device is configured to:

perform first determination processing, the first determination processing determining whether a command received from the host device via the interface circuit is one of the second commands or the transfer preparation completion command, perform acquisition processing when it is determined that the received command is the transfer preparation completion command by the first determination processing, the acquisition processing including:

transmitting, from the storage device to the host device, based on the transfer preparation completion command, a direct memory access request to request a direct memory access transfer of the first commands stored in the memory in the host device, acquiring the first commands which are transferred from the memory in the host device by direct memory access transfer based on the direct memory access request, and accessing the storage, based on each of the first commands, and access the storage based on the one of the second commands when it is determined that the received command is the one of the second commands by the first determination processing.

11. The system according to claim 10, wherein the storage device includes a first buffer to store therein an access command that is the command received from the host device or the first commands acquired by the acquisition processing, and the circuitry of the storage device is configured to:
  acquire, as a processing target command, the received access command or each of the first commands from the first buffer, and
  access the storage, based on the acquired processing target command.

12. The system according to claim 11, wherein
the storage device includes a third buffer to store therein the command received from the host device, and
the circuitry of the storage device is configured to:
  perform second determination processing, and the second determination processing determines, based on a processing state of the acquisition processing, whether or not to supply the received command stored in the third buffer to the determination processing.

13. The system according to claim 12, wherein
the acquisition processing includes transfer processing for transferring the acquired plurality of access commands to the first buffer, and
the circuitry of the storage device is configured to:
  determine that the received command stored in the third buffer is not to be supplied to the first determination processing, while the transfer processing is being performed by the acquisition processing.

14. The system according to claim 12, wherein the circuitry of the storage device is configured to:
  read a command from the third buffer,
  supply the read command to the first determination processing, regardless of a determination result obtained by the second determination processing, when the read command includes priority information indicating the priority thereof over the transfer preparation completion command, and
  execute supplying the read command to the first determination processing based on a determination result obtained by the second determination processing when the read command does not include the priority information.

15. The system according to claim 11, wherein
the first buffer, an access control circuit to execute an access to the storage, and the storage are provided for each of a plurality of channels, and
the circuitry of the storage device is configured to:
  select one out of the plurality of channels, based on the access command that is the command received from the host device or the first commands acquired by the acquisition processing, and
  store, in the first buffer in the selected channel, the access command that is the command received from the host device or the first commands acquired by the acquisition processing.

16. The system according to claim 11, wherein the storage is one or more non-volatile storages.

17. The system according to claim 10, wherein
the storage device includes a second buffer,
the circuitry of the storage device is configured to:
  store, in the second buffer, the transfer preparation completion command received from the host device, when it is determined that the received command is the transfer preparation completion command, and
  the acquisition processing includes acquiring the transfer preparation completion command from the second buffer.

* * * * *